April 15, 1969     W. M. SPICER     3,438,604
RETAINER CLIPS FOR TEMPORARY WIRING
Filed Nov. 16, 1966
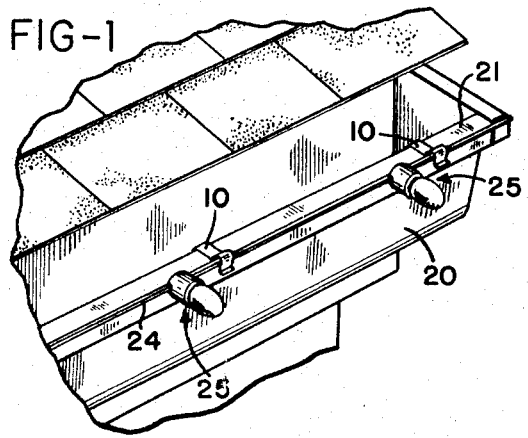
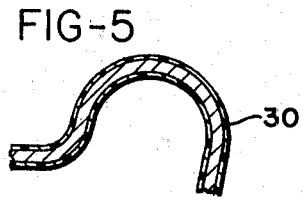
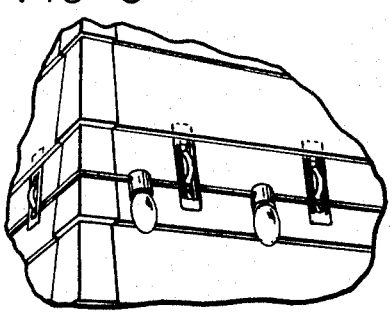
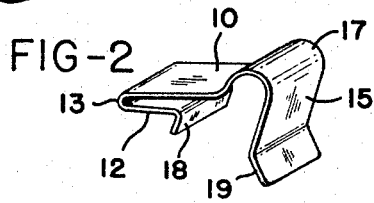
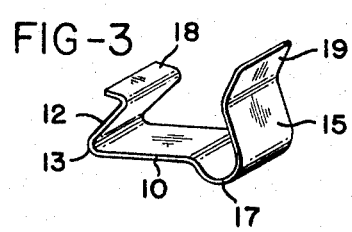
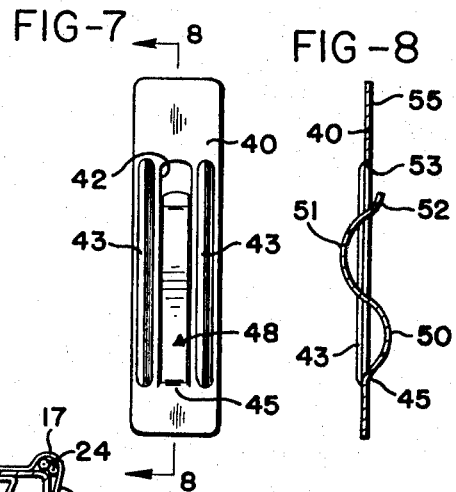
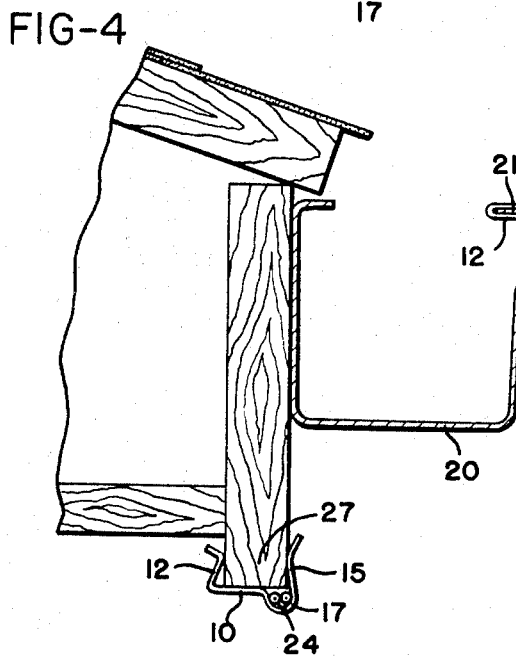
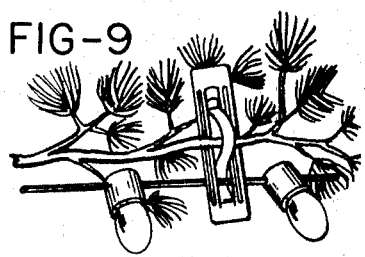
INVENTOR
WILLIAM M. SPICER
BY
*Marechal, Biebel, French & Bugg*
ATTORNEYS

United States Patent Office 3,438,604
Patented Apr. 15, 1969

3,438,604
RETAINER CLIPS FOR TEMPORARY WIRING
William M. Spicer, 5709 Mapleview Drive,
Dayton, Ohio 45432
Filed Nov. 16, 1966, Ser. No. 594,852
Int. Cl. A44b 21/00
U.S. Cl. 248—74             4 Claims

ABSTRACT OF THE DISCLOSURE

Metal retainer clips, preferably plastic coated and zinc plated, are provided for temporarily attaching wiring, as for outdoor decorations, to structure such as rain gutters, facia, and other trim on the exterior of a dwelling, or to fencing, trees, and the like. One form of retainer is for attachment to both rain gutters, standard thicknesses of facia boards and other projections with a thickness of 3/8" to 1" and another form is for attachment to tree limbs, siding, shingles, or the like.

---

This invention relates to simple inexpensive retainer clips which are useful for temporarily attaching wiring and the like to the exterior of a dwelling, to trees or shrubbery, for example in placing outdoor Christmas lighting.

Various devices have been proposed for attaching temporary outdoor wiring to house structure, particularly for a decorative effect such as at Christmas time. These devices generally require that some permanent or semipermanet attachment be made to the structure of the dwelling, or in some cases metal clips are provided on the lighting for attachment to bushes and the like. Since the arrangement is temporary, it is particularly desirable that clips as provided by this invention should be easy to apply and to remove, without requiring tools for this purpose, and the clips should grip the supporting member or structure firmly, yet they should not embed in or abrade the structure in any way, since this would leave a damaging scar or perhaps scrape away protective paint, when the clip is removed. Also, since clips of this type are most often used to support electrical wiring, it is desirable that the clips be electrically insulated if they are constructed of metal, in order to assure that no short circuit is created inadvertently, as by scraping through the insulation on the wires.

The present invention provides two forms of such retainer clips, one form being particularly useful in attaching wiring to rain gutters, facia boards, and other wood trim or other projections with a thickness of 3/8" to 1", and the other form being particularly adapted for attachment to roofing siding, or shrubbery.

The present invention, therefore, has for its principal object the provision of novel, inexpensive, and easily manipulated clips for the temporary support of electrical wiring and the like, particularly for decorative purposes; to provide such clips which are constructed from steel which is sufficiently ductile to be bent to a desired shape and to retain that shape with some spring effect; to provide such clips which preferably are coated with a protective and electrically insulating material; to provide such clips where the steel body is zinc plated to minimize corrosive action as with other metals to which the clips may be attached; and to provide such clips which are readily adapted to attachment to various supporting structure, such as rain gutters, wood trim, facia boards, or any projection with a thickness of 3/8" to 1", roofing or siding, or shrubbery.

Other objects and advantages of the invention will be apparent from the following description, the accompanying drawings and the appended claims.

In the drawings:

FIG. 1 is a perspective view illustrating the use of one form of clip provided by the invention to attach decorative lighting temporarily to a rain gutter;

FIG. 2 is a perspective detail view of one of the clips shown in FIG. 1;

FIG. 3 is a perspective view of essentially the same clip structure, with the clamp shown in an alternative position;

FIG. 4 is a detail view showing a clip as in FIG. 2 attaching wiring to the lip of a rain gutter, and a clip as in FIG. 3 attaching wiring to the bottom of a facia board;

FIG. 5 is an enlarged sectional view through a portion of one of the clips, showing the protective coating thereon;

FIG. 6 is a perspective view of a portion of a dwelling, showing another form of clip securing decorative lighting and wires to siding;

FIG. 7 is an elevational view of one of the clips shown in FIG. 6;

FIG. 8 is a longitudinal sectional view taken on line 8—8 in FIG. 7; and

FIG. 9 is a perspective view showing application of the clip of FIG. 7 to shrubbery or trees.

Referring to the drawings, which illustrate preferred embodiments of the invention, and particularly with reference to FIGS. 2 and 3, a novel clip is shown formed from an integral metal strip for providing a body having a base section 10, a clamp section 12, which is an integral part of the strip, connected to the base along the bend 13, and a retainer section 15. Both the clamp section and the retainer section extend generally outward from one side of the base section 10, extending in the same direction to form a space between these sections into which the supporting structure is clamped. A retainer loop portion 17 is formed between the base section 10 and the clamp section 15, and cooperates with the supporting structure to surround wiring passed through the loop portion. The ends of the clamp and retainer section are parts formed outwardly, as shown at 18 and 19, such that the opening between the ends of these sections is somewhat greater in width than the narrower part of the space between them. The internal surfaces of the clamp, particularly those parts which may come into engagement with the supporting structure of a dwelling, are smooth surfaces which will not cut or abrade the structure to which the clip is attached.

As shown in FIG. 1 and in FIG. 4, the type of clip shown in FIG. 2 can readily be attached to the lip of a rain gutter 20 on a dwelling. The clamp section 12 is formed to a position generally parallel and slightly spaced from the base section, and is received over the lip 21 of the rain gutter, while the retainer section extends over the front edge of the rain gutter, and the space between the upper corner of the gutter and the loop portion 17 serves as a passage for the wiring 24. This wiring may incorporate suitable sockets and lights indicated by the general reference numeral 25.

Essentially the same clip member, with the clamp section moved to an alternative position as shown in FIG. 3, where the clip is shown inverted, may be used to engage the end of a facia board or trim board 27 on the dwelling. Here, the board extends between the clamp and retainer sections, the base section 10 is pushed into engagement with the end of the board, and the loop portion forms with the board an enclosed passage for the wiring 24. The clamp section 12 can readily be moved to its alternative position by prying with a small piece of wood, the end of a screwdriver, or the like. The clip members can be sold in the configuration shown in FIG. 3, and readily modified to the alternative configuration shown in FIG. 2, merely by pressing the clamp section 12 in toward the base section.

In practice it has been found desirable to form the clip members of a plain carbon steel having a Rockwell hardness of about 90 on the B scale. This material is sufficiently ductile to be bent without great difficulty to a desired position, remain in that position, and retain sufficient spring to resist deformation and thereby provide an effective clamping action. In order to minimize corrosion and/or electrolytic action, since the clips will in most cases be used out of doors, the steel clips are zinc plated, and preferably they are then dipped or otherwise coated with a plastic material, such as a clear plastic, which provides additional corrosion protection and also provides an electrical insulation on the surface of the clip. A segment of a clip showing the plastic coating 30 is illustrated in FIG. 5.

FIGS. 6–9 show another embodiment of the invention, where a clip is provided which is particularly adapted for temporarily attaching wiring to shrubbery, as in FIG. 9, or for supporting the wiring from house siding, shingles, or the like, as shown in FIG. 6. The clip is formed as an integral metal strip body 40 having an elongated generally rectangular opening 42, approximately in its center. The body 40 is preferably flat, and at the opposite sides of the opening 42 there are stiffening ridges 43 formed upward from the material of the body.

The material struck from the body in the forming operation remains integrally attached to the body at one of the smaller edges of the opening, in the region designated by the reference numeral 45. This strip is formed as a generally S-shaped retainer section 48 which is normally rigid enough to maintain its shape, as shown particularly in FIG. 8, while having a smaller flexible connection in the region 45 to the remainder of the strip. The retainer section 48 thus is formed as an integral extension and projects outwardly from one side of the body. The portion 50 thus extends inwardly through the opening 42 and outwardly of the other side of the body and the portion 51, backward through the opening again terminating in a free end 52 which is spaced from the other small edge 53 of the opening 42.

The retainer member thus forms with the body two loop portions through which wiring, branches of shrubbery, or the like can be received and completely surrounded to guard against dislodging. In one type of use the wiring can be passed under the loop portion 50, as shown in FIG. 6, by flexing the retainer section outwardly, to the right as shown in FIG. 8. The flat end 55 of the body can then be inserted under siding boards, shingles, or the like, or into other crevices, preferably with the free end 52 of the retainer section facing the surface to which the clip is attached. Thus, the wiring is securely engaged by the clip and cannot be dislodged without removing the clip from the point of attachment.

In another use of this clip, the wiring is engaged by the clip in the same manner, and the loop portion 51 is engaged around a branch of a tree, shrubbery, or some other thin extended member, such as fence wire or the like. Again, the wiring is securely surrounded by the loop portion 50, and in this case the branch or other member to which the clip is attached is also surrounded by the loop portion 51 and adjacent parts of the clip body.

As in the case of the clip member shown in FIGS. 1–5, the modified form of clip shown in FIGS. 6–9 also is preferably zinc plated for protection, and is coated with a suitable plastic substance for further protection and for electrical insulation. Likewise, the clip members can be colored as desired in order to conceal their appearance where this may be a factor to be considered.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A clip for temporary attachment of electrical wiring and the like to facia, rain gutters and similar supporting structure, said clip comprising an integral metal strip body formed to provide a planar base section, a clamp section extending from one end of said base section and movable to a first clamping position projecting generally outward to one side of said base section and a second position spaced from and generally parallel to said one side of said base section, a retainer section extending generally outward at a substantial angle to said one side of said base section and in the same direction outwardly as said clamp section for engaging a portion of the supporting structure between said clamp section and said retainer section, a retainer loop portion intermediate said base section and said retainer section, said loop extending outwardly of the plane of said base section adapted to define a space between the clip and the supporting structure to which it is engaged for cooperating with such structure to surround at least one wire extended through said loop portion, said clamp and retainer sections and said loop portion having smooth surfaces in the regions engageable with the supporting structure and the wiring to avoid abrasion of the structure or the wire, and end parts on each of said clamp and retainer sections, said end parts being formed outwardly away from the space between said sections to facilitate placement of the clip in tight fitting position on an edge of the supporting structure.

2. A clip as defined in claim 1, wherein said metal strip body is constructed from steel having a Rockwell B hardness of approximately 90.

3. A clip as defined in claim 1, wherein said metal strip body is coated with a protective and electrically insulating material.

4. A clip as defined in claim 3, wherein said metal strip is a steel strip and is zinc plated beneath said coating.

References Cited

UNITED STATES PATENTS

| | | | |
|---|---|---|---|
| 466,932 | 1/1892 | Cornell | 248—74 X |
| 1,783,967 | 12/1930 | Kearney | 24—129 X |
| 1,867,636 | 7/1932 | Tinklepaugh | 24—81 X |
| 2,456,553 | 12/1948 | Churchill | 248—74 X |
| 2,555,562 | 6/1951 | Bales | 24—259 |
| 2,723,432 | 11/1955 | Flora | 24—81 X |
| 3,124,327 | 3/1964 | Meszaros | 248—74 |
| 3,226,468 | 12/1965 | Patton | 248—74 X |

FOREIGN PATENTS

| | | |
|---|---|---|
| 978,127 | 4/1951 | France. |
| 1,098,064 | 1/1961 | Germany. |

CHANCELLOR E. HARRIS, *Primary Examiner.*

U.S. Cl. X.R.

24—73, 81